United States Patent
Lin

(10) Patent No.: US 11,144,217 B2
(45) Date of Patent: Oct. 12, 2021

(54) DATA PROTECTION METHOD AND ASSOCIATED STORAGE DEVICE

(71) Applicant: JMicron Technology Corp., Hsin-Chu (TW)

(72) Inventor: Shih-Ling Lin, Hsinchu (TW)

(73) Assignee: JMicron Technology Corp., Hsinchu County (TW)

( * ) Notice: Subject to any disclaimer, the term of this patent is extended or adjusted under 35 U.S.C. 154(b) by 43 days.

(21) Appl. No.: 16/589,162

(22) Filed: Oct. 1, 2019

(65) Prior Publication Data
US 2020/0104061 A1 Apr. 2, 2020

Related U.S. Application Data

(60) Provisional application No. 62/739,866, filed on Oct. 2, 2018.

(30) Foreign Application Priority Data

Mar. 25, 2019 (TW) .................................. 108110224

(51) Int. Cl.
*G06F 3/06* (2006.01)
*G06F 16/11* (2019.01)
*G06F 21/54* (2013.01)

(52) U.S. Cl.
CPC .......... *G06F 3/0623* (2013.01); *G06F 3/0632* (2013.01); *G06F 3/0659* (2013.01);
(Continued)

(58) Field of Classification Search
CPC ...... G06F 3/0623; G06F 3/0679; G06F 21/54; G06F 3/0659; G06F 21/79; G06F 16/11;
(Continued)

(56) References Cited

U.S. PATENT DOCUMENTS 8,060,716 B2 * 11/2011 Ito ........................... G06F 9/468
711/163
2005/0027957 A1 * 2/2005 Page ................... G06F 12/1425
711/163
(Continued)

FOREIGN PATENT DOCUMENTS

TW 201329707 A1 7/2013
TW I451248 B 9/2014
(Continued)

OTHER PUBLICATIONS

J. D. Strunk, G. R. Goodson, M. L. Scheinholtz, C. A. N. Soules and G. R. Ganger, "Self-securing storage: protecting data in compromised systems," Foundations of Intrusion Tolerant Systems, 2003 [Organically Assured and Survivable Information Systems], Los Alamitos, CA, USA, 2003.*

*Primary Examiner* — Pierre Miche Bataille
(74) *Attorney, Agent, or Firm* — Winston Hsu

(57) ABSTRACT

The present invention provides a data protection method and storage device. The data protection method includes: (A): during an initial period after the storage device is connected to a host, detecting the storage device and determining whether the storage device needs to be performed with data protection; (B): when the storage device needs to be performed with data protection in Step (A), modifying a predetermined writing destination that the host writes data to a storage unit of the storage device, to make the data from the host be written to another writing destination rather than being written to said writing destination; or writing the data from the host into a control chip or a bridge chip of an inner memory or an inner register, rather than writing the data from the host into the storage device; and (C): reporting to the host that the writing operation is completed.

10 Claims, 2 Drawing Sheets

(52) U.S. Cl.
CPC ............ *G06F 3/0673* (2013.01); *G06F 16/11* (2019.01); *G06F 21/54* (2013.01); *G06F 2221/031* (2013.01)

(58) Field of Classification Search
CPC .... G06F 3/0656; G06F 3/0673; G06F 3/0632; G06F 3/0619; G06F 2221/031; G06F 3/06
See application file for complete search history.

(56) References Cited

U.S. PATENT DOCUMENTS

| | | | | |
|---|---|---|---|---|
| 2008/0052709 | A1* | 2/2008 | Tang | G06F 21/805 718/1 |
| 2010/0020679 | A1* | 1/2010 | Decraene | H04L 45/02 370/219 |
| 2011/0154102 | A1* | 6/2011 | Akutsu | G06F 11/2074 714/6.1 |
| 2015/0186643 | A1* | 7/2015 | Tu | G06F 21/54 726/23 |
| 2017/0286644 | A1* | 10/2017 | Dong | G06F 11/3017 |
| 2019/0014089 | A1* | 1/2019 | Wei | H04L 63/0245 |
| 2019/0332469 | A1* | 10/2019 | Radjai | G06F 9/544 |

FOREIGN PATENT DOCUMENTS

| | | |
|---|---|---|
| TW | 201516680 A | 5/2015 |
| TW | I514145 B | 12/2015 |

\* cited by examiner

DATA PROTECTION METHOD AND ASSOCIATED STORAGE DEVICE

CROSS REFERENCE TO RELATED APPLICATIONS

This application claims the benefit of the U.S. provisional application No. 62/739,866 filed on Oct. 2, 2018. The contents of the above-mentioned applications are all hereby incorporated by reference.

BACKGROUND OF THE INVENTION

1. Field of the Invention

An objective of the present invention is to provide a method to achieve the following effect: during the external storage device being mounted onto the host (e.g. a computer device), preventing the data thereof from being deleted, modified or destroyed by existing bugs or malwares, within a period of time.

Further, the term "within a period of time" here may mean from the time the user mounts (or connects) the external storage device onto the host to the time the host recognizes the external storage device and displays the message informing the existence of the external storage device so that the user can start accessing it. In addition, the term "mount" here may mean either the device has been connected to the host for a while, or the device is previously removed and is now connected to the host again, which may be performed in the software or hardware sense. "Unmounting in the software sense" means the device is not actually unplugged from the host and is still physically attached to the host, while "unmounting in the hardware sense" means the device has been physically unplugged and can be inserted back to the host later.

2. Description of the Prior Art

Due to the portability and easy plugging, external storage devices (such as external hard drives, flash memory devices, etc.) are ubiquitous in the market now. Storing photos and work files in external storage devices is also a common practice.

In general, after the device is connected to the host, if the user does not make further operations to the host, the data should not be deleted, modified and destroyed without a cause. However, studies have shown that hosts worldwide make it possible for external storage devices to suffer from potential risks of losing files. This is because the operating system of a computer may be affected by the system vulnerabilities or malicious programs (e.g. malwares), causing the data in the external storage device to be rewritten or deleted. Even if the user just connects the external storage device to the host for a while, the stored data may suddenly disappear or destroyed. For example, when the user connects the hard disk or the portable disk to the USB slot of the computer through the USB cable, after a few seconds, the message such as "Your device is ready" will pop up on the screen. However, when the user sees this message, it is already too late. Because the storage device may be tampered within a short time (e.g. a few seconds mentioned above).

Further, after the external storage device is mounted to the host for a period of time, the malicious programs may have performed one or more abnormal writing operations to the file system in the storage device, resulting in disappearance or damage of the data.

The computer manufacturers are generally reluctant to solve these potential problems. Even if they release system updating patches to mitigate the damage caused by specific malicious programs, most of the users in general probably are unaware of or overlook these patches. Further, since it is difficult for manufacturers to solve all possible potential risks at once, alternatively, the manufacturers must often recommend users to back up the data to the cloud. However, using cloud as the solution is not without its own drawbacks, and the convenience of using external storage devices still remain irreplaceable.

SUMMARY OF THE INVENTION

To address the above issues, an objective of the present invention is to provide a method to achieve the following effect: during the external storage device being mounted onto the host (e.g. a computer device), prevent the data thereof from being deleted, modified and destroyed by existing bugs or malwares, within a period of time. More specifically, the present invention may be realized via updating the external storage device.

An embodiment of the present invention proposes a data protection method, which provides security protection and comprising following steps: (A): during an initial period after the storage device is connected to a host, detecting the storage device and determining whether the storage device needs to be performed with data protection; (B): when it is determined that the storage device needs to be performed with data protection in Step (A), modifying a predetermined writing destination that the host writes data to a storage unit of the storage device, in order to make the data from the host be written to another writing destination rather than being written to said writing destination of the storage device; or writing the data from the host into a control chip or a bridge chip of an inner memory or an inner register, rather than writing the data from the host into the storage device; and (C): reporting to the host that the writing operation is completed.

Another embodiment of the present invention provides a storage device for data processing and security protection, the storage device comprises a storage unit and a controller. The controller is arranged to execute following steps: (A): during an initial period after the storage device is connected to a host, detecting detection the storage device and determining whether the storage device needs to be performed with data protection; (B): when it is determined in Step (A) that the storage device needs to be performed with data protection, modifying a predetermined writing destination that the host writes data to a storage unit of the storage device in order to make the data from the host be written to another writing destination rather than said writing destination of the storage device; or writing the data from the host into a control chip or a bridge chip of an inner memory or an inner register, rather than writing the data from the host into the storage device; and (C): reporting to the host that the writing operation is completed.

In view of the above, the present invention is capable of providing protection during the period of time when the external hard drive is just connected to the host (e.g. a computer), in order to prevent data from being deleted or tampered. Further, during the host transmitting commands and data to the storage unit, the present invention may utilize the controller to filter specific commands and data, which may greatly reduce the potential risk of being attacked for data in the storage device, and thereby protects the data from being sabotaged by malicious attempts.

These and other objectives of the present invention will no doubt become obvious to those of ordinary skill in the art after reading the following detailed description of the preferred embodiment that is illustrated in the various figures and drawings.

DETAILED DESCRIPTION

Some phrases in the present specification and claims refer to specific elements; however, please note that the manufacturer might use different terms to refer to the same elements. Further, in the present specification and claims, the term "comprising" is open type and should not be viewed as the term "consists of." The term "electrically coupled" can refer to either direct connection or indirect connection between elements. Thus, if the specification describes that a first device is electrically coupled to a second device, the first device can be directly connected to the second device, or indirectly connected to the second device through other devices or means.

In order to solve the problem that the data of the external storage device might be modified or destroyed by malicious programs (e.g. malwares) when the external storage device is just connected to the host, the present invention proposes a novel method for protecting the data of an external storage device from being deleted, modified or destroyed.

Figure 1:
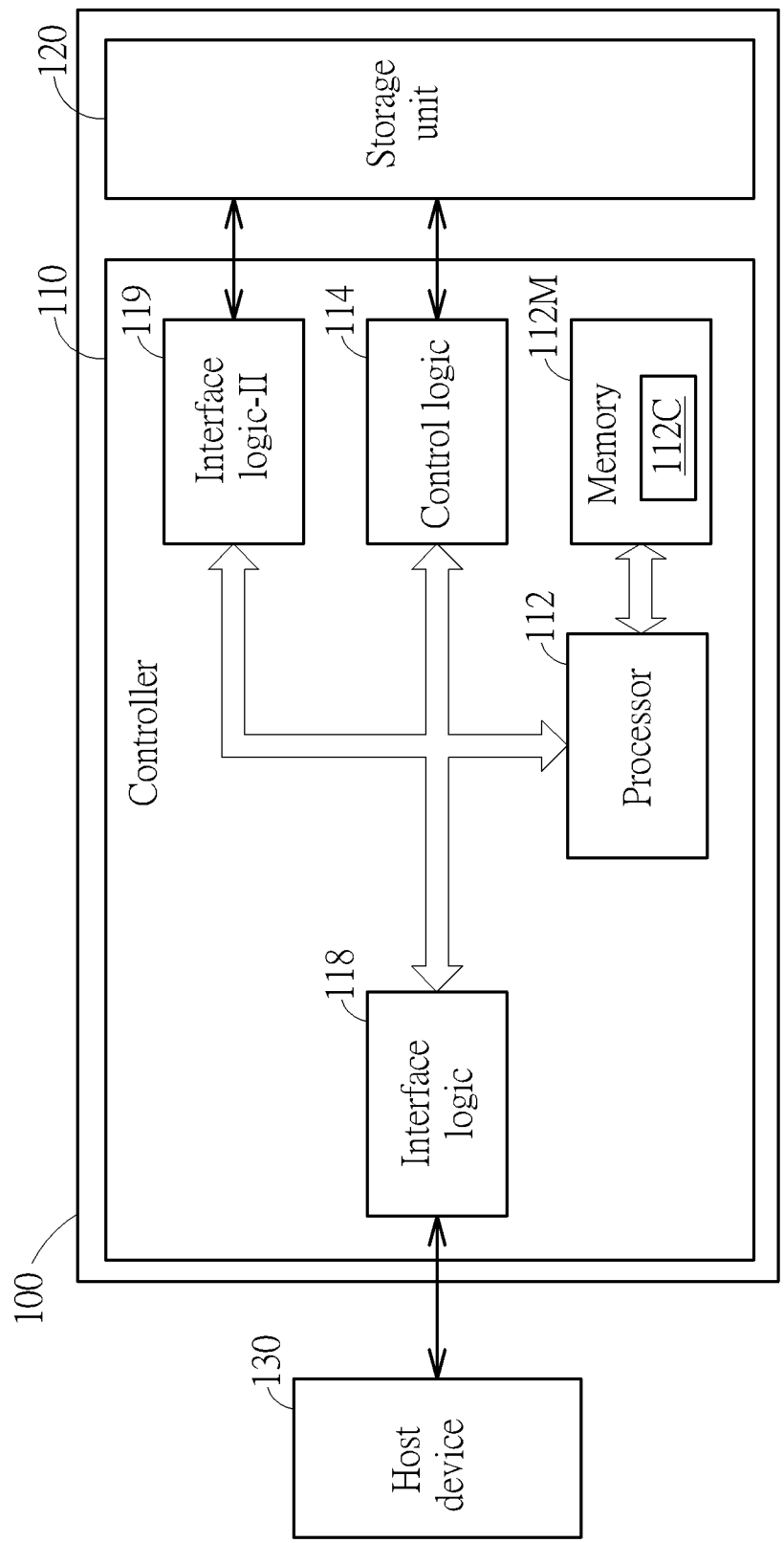
FIG. 1 is a diagram illustrating a storage device according to an embodiment of the present invention.

Please refer to FIG. 1, which is a diagram illustrating a storage device 100 according to an embodiment of the present invention. The storage device 100 comprises a storage unit 120 and a controller 110, and the controller 110 is used to access the storage unit 120. According to this embodiment, the controller 110 comprises a processor 112, a memory 112M, a control logic 114, an interface logic 118 and an interface logic-II 119. The memory 112M is used to store a program code 112C, and the processor 112 is used to execute the program code 112C in order to access the storage unit 120. The control logic 114 or the interface logic-II 119 is used to control the storage unit 120. Please note that the elements in FIG. 1 are merely for illustrative purposes, and are not meant to be a limitation of the scope of the present invention. As long as similar/identical functions can be achieved, some elements thereof may be replaced or omitted.

In an embodiment, the storage device 100 may be a portable memory device (e.g. a memory module conforming to the SD/MMC, CF, MS or XD standard), and the host device 130 is an electronic device connectable to memory devices, such as a smartphone, laptop computer, desk computer, etc. In another embodiment, the storage device 100 may be a solid state drive (SSD) or an embedded storage device conforming to the universal flash storage (UFS) or embedded multimedia Card (EMMC) standards, in order to be configured in an electronic device, such as a smartphone, laptop computer, desk computer, etc., and meanwhile, the host device 130 may be a processor of the electronic device.

More specifically, the storage device 100 may be implemented as a hard drive enclosure (hereinafter HDD enclosure), such as a 2.5-inch or 3.5-inch HDD enclosure. When the storage device 100 is a 2.5-inch HDD enclosure, the power can be provided by the host device 130. When the storage device 100 is a 3.5-inch HDD enclosure, it can further connect to an external power source. The storage device 100 comprises the controller 110 and the storage unit 120, wherein the controller 110 comprises an interface logic 118 for performing transmissions of the host device 130. The processor 112 is arranged to execute various associated operations, and the control logic 114 or the interface logic-II 119 is arranged for performing transmissions of the storage unit 120.

Figure 2:
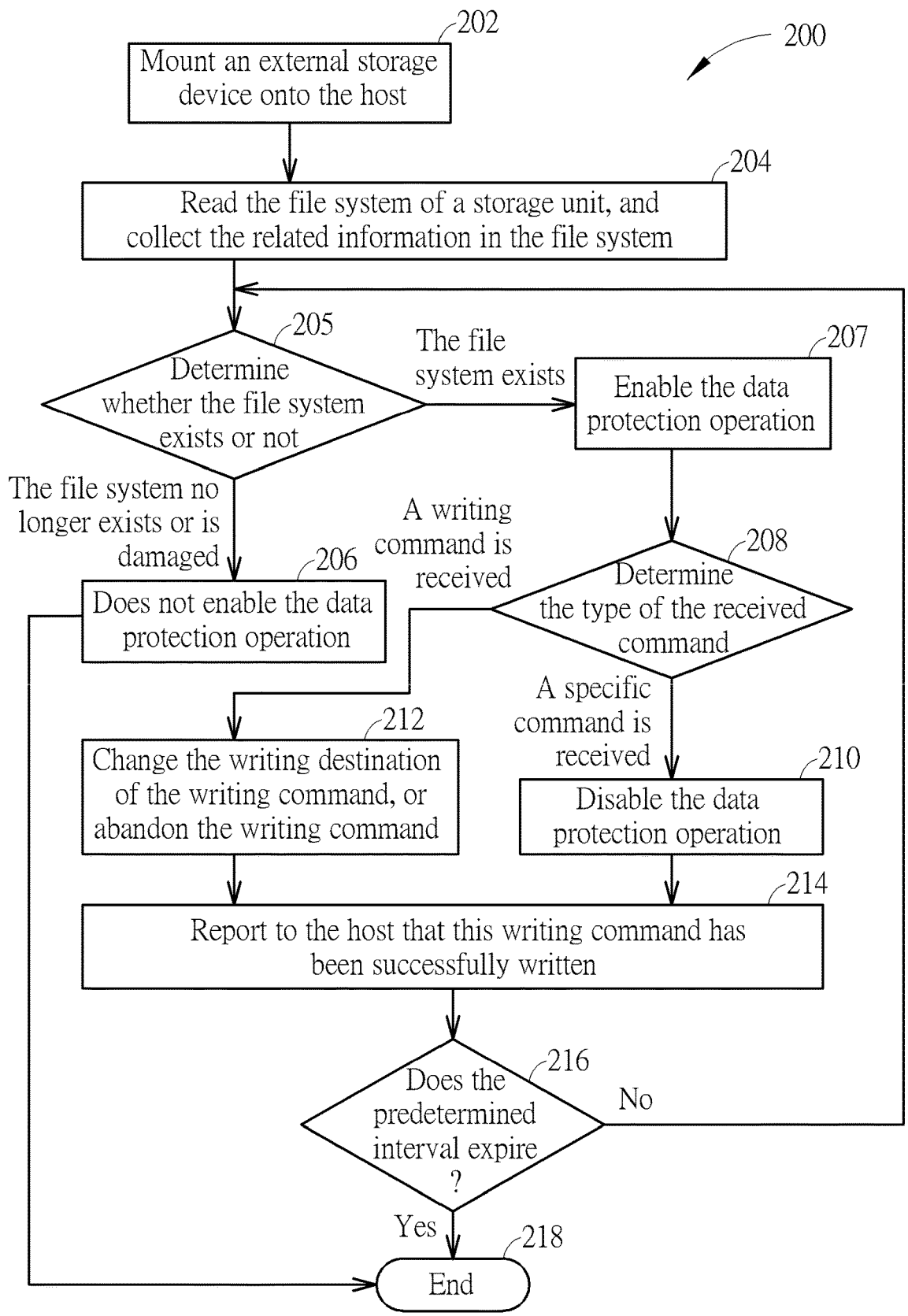
FIG. 2 is a flowchart illustrating a method of data protection that applied to a storage device according to an embodiment of the present invention.

Please refer to FIG. 2, which is a flowchart illustrating a method 200 of data protection that applied to a storage device according to an embodiment of the present invention. If a substantially identical result can be obtained, these steps are not required to be executed in the exact order shown in FIG. 2, and it is also possible that one or more other steps may be inserted between these steps. The method shown in FIG. 2 may be adopted by the storage device 100 shown in FIG. 1, and can be briefly summarized as follows:

Step 202: Initially, mount an external storage device (such as the storage device 100) onto the host, which can be achieved via a USB cable and a USB slot. However, the present invention is not limited to merely using the USB elements to connect the external device to the host.

Moreover, the host may have a built-in card reader (which can also be replaced with an external card reader), for inserting one or more memory cards.

Step 204: The controller reads the file system of the storage unit (such as the storage unit 120), and collects the related information in the file system.

Step 205: Determine whether the file system exists or not.

Step 206: When it is determined that there is no file system in the storage unit, or the file system is damaged, the controller does not enable the data protection operation (since it is not necessary to protect the data in this situation), or disables the data protection operation if has been already enabled. Then, the flow goes to Step 218.

Step 207: When it is determined that the file system exists in the storage unit, the controller enables the data protection operation during the initialization process where the host system identifies the external storage device.

Step 208: Under the situation where the data protection operation has been enabled, determine the type of the command received by the controller. When it is determined that the controller receives at least one specific command, the flow goes to Step 210. When it is determine that the controller receives a writing command, the flow goes to Step 212.

Step 210: Disable the data protection operation, and then the flow goes to Step 214.

Step 212: Change the writing destination of the writing command (e.g. a specific location of the storage), or abandon the writing command. For example, the writing destination can be changed to another writing destination that is different from the predetermined writing destination. In another example, the writing destination can be changed to a control chip of the storage device or the internal memory/register of a bridge chip rather than a location inside the storage unit.

Step 214: Report to the host that this writing command has been successfully written, in order to make the host deem the writing operation (which may include the tempering actions of malicious programs) is completed.

Step 216: Determine whether the predetermined interval (i.e. from the time the external device is just inserted to the host to the time the external device loses the connection from the host) expires. If yes, the flow goes to Step 218; if not, the flow goes back to Step 205, and the steps are repeated until the data protection operation is disabled (e.g. the flow goes to Step 210 from Step 208) or the flow has been executed for a predetermined duration.

Step 218: Once the data protection operation is disabled, do not enable it again (until the external storage device is mounted onto the host once again).

When a file system exists in the storage unit, during the initialization process where the host system identifies the external storage device (also the period the data is vulnerable to the attacks), the controller may enable the data protection operation with the following methods:

I. Refer to a sequential order of receiving specific commands or a combination of specific commands.

II. Refer to whether special commands are received or regularly received (such as receiving one or more special commands every few seconds).

III. Refer to whether one or more locations (such as logical block addresses (LBAs), to which one or more writing commands are written, are received. For example, the data protection operation may be enabled when the writing destination is directed to the file system disk area or locations within the cluster range.

IV. Refer to whether one or more specific locations (such as LBAs), read by one or more reading commands, are received. For example, when a reading command reads the last LBA in the storage unit, the data protection operation may be enabled.

V. Directly enable the data protection operation.

When the data protection operation has been enabled, whether to disable the data protection operation may be determined based on whether the controller receives the specific command. That is, some types of commands may be directly determined as not malicious attempts from malwares, and therefore the follow-up protection operations can be omitted. For example, the specific commands may comprise, but are not limited to, the following types of commands:

I. A data synchronizing command, such as the "SYNCHRONIZE CACHE" of the SCSI.

II. A sequential order of specific commands or a combination of the specific commands.

In Step 212, when the data protection operation is enabled and the controller receives "writing command", execute one of the following two command processing methods:

I. Change the location of writing commands, by introducing the written files to a non-existing idle space of the file system, wherein the information of the file system collected in Step 204 may be utilized to determine which location is idle space.

II. Introduce the written data carried by commands to specific internal storage space of the control, and then ignore or abandon said written data, wherein said specific storage space can mean internal memories or internal registers, but the present invention are not limited thereto. Said specific storage space can also be realized as a garbage collection zone, where the collected garbage (i.e. the malicious programs or writing commands) may be ignored or altogether deleted when it reaches a certain amount.

Both the above two methods may protect the data from being sabotaged, and in other words, since the malicious programs or writing commands have been introduced to a non-existing location or an independent space that does not affect the storage data. Therefore, any possible sabotage to the storage data (such as data modifications or deletions) can be perfectly prevented.

After Step 214 reports to the host that the writing command has been successfully written, the goal of "deceiving" the host is achieved, which makes the host determines that the writing operation (i.e. the modifications made by malicious programs) has been completed. Therefore, the aim of data protection is achieved.

Step 216 continuously determines whether there is a need for enabling the data protection operation during the predetermined period (i.e. the period right after the external device is just inserted to the host), until the predetermined period is over. Once the predetermined period is over, the data protection operation will be disabled and will not be enabled again, since the storage device no longer suffers from the risk of being tampered after the predetermined period. However, after the external storage device is removed from the host and then connected to the host again, the flow in FIG. 2 can be started over again.

In view of the above, the present invention is capable of providing protection during the period of time when the external hard drive is just connected to the host (e.g. a computer), in order to prevent data from being deleted or tampered. Further, during the host transmitting commands and data to the storage unit, the present invention may utilize the controller to filter specific commands and data, which may greatly reduce the potential of data being attacked and thereby protects the data in the storage device from being sabotaged by malicious attempts.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data protection method, arranged to provide security protection, the data protection method comprising following steps:

(A): during an initial period after the storage device is connected to a host, detecting the storage device and determining whether the storage device needs to be performed with data protection, wherein the initial period is a period from the storage device being mounted onto the host to the storage device being recognized by the host;

(B): when it is determined that the storage device needs to be performed with data protection in Step(A), modifying a predetermined writing destination that the host writes data to a storage unit of the storage device, in order to make the data from the host be written to another writing destination rather than being written to said writing destination of the storage device; or writing the data from the host into a control chip or a bridge chip of an inner memory or an inner register, rather than writing the data from the host into the storage device; and (C): reporting to the host that the writing operation is completed.

2. The data protection method of claim 1, wherein when it is determined in Step(A) that the data protection is not needed, Step(B) is not executed in order to preserve the predetermined writing destination to the host writes data to the storage device.

3. The data protection method of claim 1, wherein the step of determining whether the storage device needs to be performed with data protection comprises:

reading a file system in the storage device, and collecting information related to the storage device in the file system.

4. The data protection method of claim 3, further comprising:

when it is detected that no file system exists in the storage unit or the file system has been damaged, a controller of the storage device does not enable data protection operation since for there is no need to perform data protection operation in this situation.

5. The data protection method of claim 3, further comprising:

when it is detected that a file system exists in the storage unit, a controller of the storage device enables data protection operation during an initialization process where the host recognizes an external.

6. The data protection method of claim 5, further comprising:

when the data protection operation has been enabled and the controller receives a writing command, modifying the writing destination of the writing command, or abandon the writing command.

7. The data protection method of claim 5, comprising:

when the data protection operation has been enabled and the controller receives at least one specific command, disabling the data protection operation.

8. The data protection method of claim 5, wherein during the initial period and before the data protection operation is disabled, repeating Steps A-C.

9. The data protection method of claim 5, wherein once the data protection operation is disabled, it will not be enabled again until time the storage device is disconnected from and connected to the host.

10. A storage device, for data processing and providing security protection, the storage device comprising:

a storage unit; and a controller, arranged to execute following steps:

(A): during an initial period after the storage device is connected to a host, detecting detection the storage device and determining whether the storage device needs to be performed with data protection, wherein the initial period is a period from the storage device being mounted onto the host to the storage device being recognized by the host;

(B): when it is determined in Step(A) that the storage device needs to be performed with data protection, modifying a predetermined writing destination that the host writes data to a storage unit of the storage device in order to make the data from the host be written to another writing destination rather than said writing destination of the storage device; or writing the data from the host into a control chip or a bridge chip of an inner memory or an inner register, rather than writing the data from the host into the storage device; and (C): reporting to the host that the writing operation is completed.

* * * * *